United States Patent Office 3,429,244
Patented Feb. 25, 1969

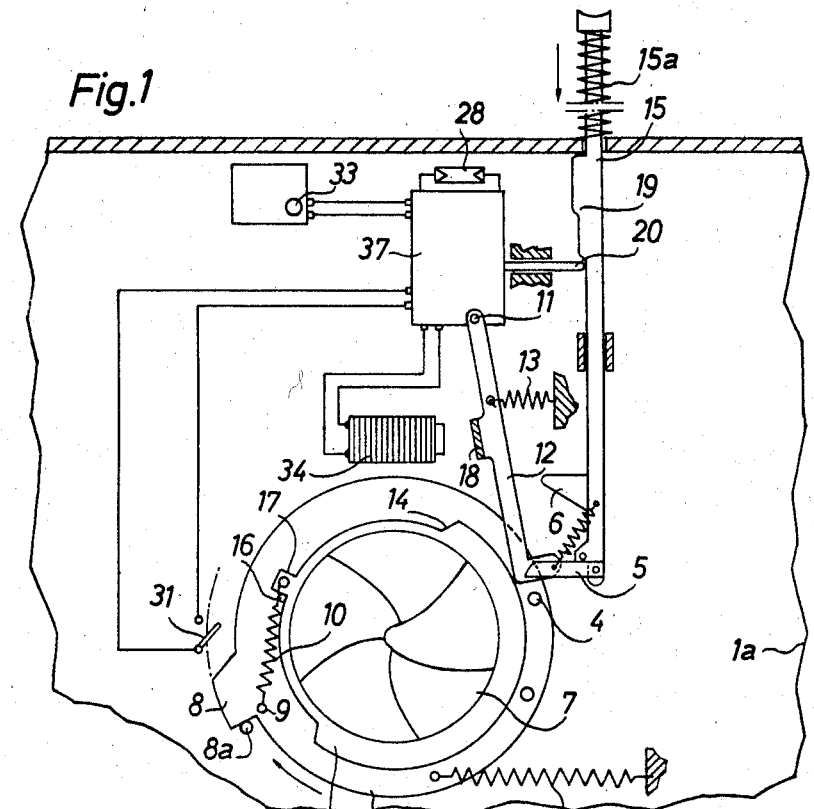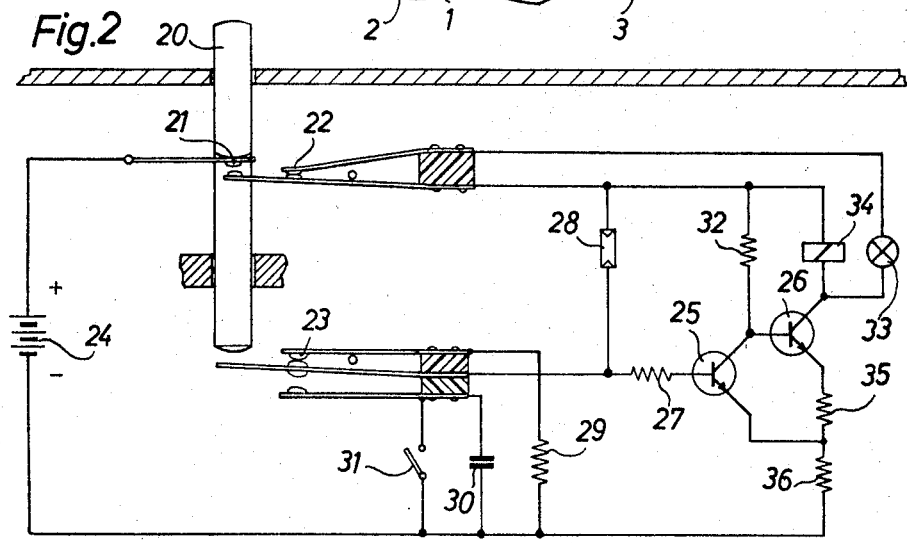
INVENTOR.
ERWIN v.WASIELEWSKI

3,429,244
SHUTTER ACTUATING ARRANGEMENT
Erwin von Wasielewski, Munich, Germany, assignor to Agfa-Gevaert Aktiengesellschaft, Leverkusen, Germany
Filed Dec. 1, 1966, Ser. No. 598,258
Claims priority, application Germany, Dec. 1, 1965,
A 50,927
U.S. Cl. 95—10        10 Claims
Int. Cl. G01j 1/00, 1/52; G03b 9/00

The present invention relates to an arrangement for photographic cameras, which provides an indication when the prevailing light conditions are insufficient to result in satisfactory exposures.

Heretofore, arrangements of the preceding species accomplished their functions through the application of a considerably large number of switching elements. These switching elements were, generally, of the mechanical type, and as a result they were subject to the undesirable characteristics of wear, slow response, and complex construction.

Accordingly it is an object of the present invention to provide an arrangement for photographic cameras whereby a warning indication appears whenever the prevailing light conditions are insufficient to result in a satisfactory exposure.

Another object of the present invention is to provide an arrangement for photographic cameras, of the character described, which provides a warning indication and inhibits release of the camera shutter when ever the prevailing light conditions are unsatisfactory.

Yet another object of the present invention is to provide an arrangement for photographic cameras as described, whereby the user may override the warning indication and locking action of the shutter, and release the shutter when desired.

Still another object of the present invention is to provide an arrangement for photographic cameras as set forth, which performs the required switching functions through a transistorized switching circuit.

A further object of the present invention is to provide an arrangement for photographic cameras, as set forth, having a minimum number of operating elements.

A yet further object of the present invention is to provide an arrangement for photographic cameras, as described, which is reliable in operation and may be maintained economically.

A still further object of the present invention is to provide an arrangement for photographic cameras, as set forth, which may be simply manufactured and assembled within cameras.

With the preceding objects in view, the present invention comprises:

(a) actuating means adapted to move between an inoperative position and an operative position in which it maintains said shutter in open position;

(b) means permanently tending to move said actuating means into inoperative position;

(c) electromagnetic means tending to move said actuating means in operative position upon energization;

(d) electrical indicator means adapted to indicate the sufficiency of ambient light for exposure purposes;

(e) a shutter opening member adapted to move the said shutter into said open position thereof;

(f) photosensitive means the resistance of which varies with the intensity of ambient light;

(g) a source of direct current;

(h) switching means comprising a first transistor connected to said electromagnetic means and said indicator means for operating same;

(i) a second transistor for driving said first transistor between conducting and nonconducting states, said electromagnetic means and said indicator means being energizable and operable when said first transistor is in the conducting state; and (j) means coupling said photosensitive means to said second transistor for controlling latter in relation to the intensity of the ambient light.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a functional schematic diagram showing the mechanical operating parts of the arrangement in accordance with the present invention; and FIG. 2 is an electrical schematic diagram and shows the transistorized circuit as well as the electrical switching circuitry actuated by the mechanical elements shown in FIG. 1.

Referring to the drawing, FIG. 1 illustrates the principal construction of an automatic shutter having numerous applications in the art. A shutter-opening ring 1 and closing ring 2 are both rotatably mounted within the camera housing 1a. The diaphragm blades 7 are secured to the rings 1 and 2 through means of pin-slot connections, now shown. When the ring 2 is turned, in a clockwise direction, in relation to the ring 1, the diaphragm blades 7 are moved out of the path of the opening through the ring 2.

A tension spring 3, secured to the housing 1a, draws upon the ring 1. The spring exerts a force upon the ring, which tends to rotate the latter in a counterclockwise direction. A pin 9, secured to the ring 1, retains one end of a spring 10 which is held, at the other end, by a lug 17 of the shutter closing ring 2. The spring 10 acts upon the ring 2 so as to result in a counterclockwise force which tends to maintain the lug 17, of the ring 2, against a stop pin 16 secured to the ring 1.

The shutter opening ring 1 has, further, a pin 4 mounted upon it which engages an interrupter link 5 of an actuating or release rod 15. When the release rod 15 is depressed, the link or pawl 5 turns the ring 1 in a clockwise direction. During this rotational motion of the ring 1, the pin 4 moves out of the path of motion of the pawl 5.

A lever 12 is rotatably mounted upon a pin 11 secured to the housing 1a. By executing a clockwise rotation, the lever 12 can bear against an arresting edge 14 on the ring 2, when the latter is in a particular angular position. The lever 12 is acted upon by a spring 13, secured to the housing 1a, which tends to counteract the preceding motion of the lever by exerting a force thereon which tends to rotate the lever in a counterclockwise direction. The release rod 15, on the other hand, is provided with a nose portion 6 which acts upon the lever 12 and against the action of the spring 13, when the release rod 15 is depressed. Accordingly, the nose portion 6 acts to move the lever 12 against the arresting edge 14.

The lever 12 is provided with a soft iron disc 18 which cooperates with an electromagnet 34. The electromagnet is connected to a timing arrangement 37 which includes a photosensitive element 28 exposed to the ambient light conditions. The timing arrangement 37 also includes a switch which is actuated by a rod member 20 when the latter is acted upon by the cam rise 19, upon depression of the release rod 15. The timing arrangement 37 is, moreover, connected to a switch 31 which becomes closed, by the cam 8 of the ring 1, when the latter is in the cocked position.

The mechanical operation of the shutter is as follows:

When the release rod 15 is depressed, the switches controlled by the rod member 20, becomes actuated.

During the time that the release rod 15 is depressed, the interrupter pawl 5 rotates the ring 1 against the action of the spring 3. As the release motion progresses, the pin 4 moves out of the path of motion of the interrupter pawl 5, so that when the pin 4 is entirely disengaged from the pawl, the ring 1 tends to return to its original position through the action of the spring 3. However, shortly prior to the instant when the pin 4 is thus disengaged from the pawl, the nose portion 6 moves the lever 12 in a clockwise direction and thereby arrests the shutter closing ring 2 in its position. The return of the lever 12 to its original position, as a result of the action of spring 13, is inhibited through the electromagnet 34, which is energized at this point. Thus the controlling circuit of the magnet, to be described in detail, energizes the electromagnetic coil and retains, thereby, the soft iron disk 18 against the core of the electromagnet. Due to the cam rise 8, the switch 31 is closed in this position of the ring 1.

When the release member 15 has been fully depressed, the ring 1 is released so that it may return to its original or initial position. The ring 2, however, cannot pursue this motion of the ring 1, since it is held in position by the lever 12. As a result of the motion of the ring 1, the spring 10 is placed into a tensioned state. Due to the relative motion of both of these rings, the diaphragm plates 7 are removed from the opening of the ring 2 so that the latter is exposed to the prevailing light. At the same time, the switch 31 is reopened. Through the functional procedure of the timing circuit, still to be described, the electromagnet 34 becomes de-energized. In this manner, the lever 12, due to the action of spring 13 releases the arresting edge 14, and thereby allows the ring 2 to return to its original or initial position, as a result of the action of spring 10. With the completion of this procedure, the shutter is again closed. When the release rod 15 is returned to its initial position, as a result of a return spring 15a, the initial or starting position of the camera is again attained. In this initial position, the spring 3 acts upon the ring 1 so that the latter is firmly held in position as a result of the engagement of the cam rise 8 with the pin 8a secured to the housing 1a.

The detailed construction of the timing arrangement is shown in FIG. 2. As a result of the action of cam rise 19, on the release rod 15, the rod member 20 actuates, in proper sequence, the contacts 21 and 22, and the switch 23. The switch 21 is connected in series with a power source 24 which supplies current to a switching circuit. The switching circuit includes two npn transistors 25 and 26. The collector of transistor 25 is connected to the base of transistor 26. The base of transistor 25 leads to the positive terminal of the power source or battery 24, by way of the path of resistor 27, photosensitive element 28 and contact 21. The photosensitive element 28 is connected, furthermore, to the movable center arm of the switch 23 which leads to the negative terminal of the battery 24, by way of the resistor 29. The normally-open contact of the switch 23 leads to a capacitor 30 which, in turn, is also connected to the negative terminal of the battery 24. The capacitor 30 is bridged by a short-circuiting switch 31.

The collector of transistor 25 is connected, by way of resistor 32 and switch 21, to the positive terminal of the battery 24. The electromagnet 34, having one end connected to the collector of transistor 26, is similarly connected to the positive terminals of the battery. In parallel with the electromagnet 34 is an indicating lamp 33 which may be disconnected from the positive terminal of the battery 24 through the action of the switching contact 22. The emitter of transistor 26 is coupled, through resistor 35, to the emitter of transistor 25. The junction of resistor 35 and the emitter of transistor 25 leads to the negative terminal of the battery 24, via the resistor 36.

The operation of the arrangement, in accordance with the present invention, is as follows:

In the initial or starting position of the circuit, all switches and mechanical elements assume the positions shown in the drawing. When the release rod 15 is depressed, the switch 21 becomes closed as a result of the cam rise 19 acting upon the rod member 20. Due to this action, the switching circuit including transistors 25 and 26 becomes energized. The base of transistor 25 acquires thereby a potential determined by the photosensitive element 28 and the fixed resistor 29. If bright light conditions prevail so that the resistance of the photosensitive element is small, the base potential of the transistor 25 is positive in relation to its emitter potential. Under these conditions the transistor 25 is in a conducting state. Due to the corresponding base potential of the transistor 26 in relation to the emitter thereof, the transistor 26 remains cut off. As a result, the indicating lamp 33 within the window of the viewer, remains extinguished.

If the intensity of the prevailing light conditions drops below a predetermined limit, the potential difference between the base and the emitter of transistor 25 passes through a specific threshold value. In this manner the transistor 25 becomes cut off and the transistor 26 conducts. As a result, the electromagnet 34 becomes energized and the indicating lamp 33 commences to glow. The user of the camera is thereby warned that, for example, instability problems may arise if he does not employ a tripod. The energization of the electromagnet 34 remains temporarily ineffective, since the disk 18 cannot as yet bear against the core of the electromagnet 34.

The release rod 15 may be further depressed independent of the indicating state of the lamp 33. As a result, the switch 22 becomes opened so that the indicating lamp 33 is disconnected from the power source or current providing circuit. At the same time the switch 23 is actuated which causes the resistor 29 to become replaced in the circuit by the capacitor 30. The latter is, however, as yet, short-circuited due to the closed switch 31 held in position by the cam rise 8. The timing circuit 37 assumes, thereby, the states whereby control is exercised by the prevailing light conditions. Accordingly, the transistor 25 is cut off and the transistor 26 energizes the electromagnet 34 in accordance with the release process, already described. The shutter-opening ring 1, executes its motion, during which it opens the switch 31. The closing ring 2, however, is prevented from executing its motion, as a result of the lever 12 which was brought into engagement with the electromagnet 34 through the action of the nose portion 6 on the release rod 15.

If the current through the photosensitive element 28, on its way to the charging capacitor 30, raises the base potential of the transistor 25 to the extent that the latter becomes conducting, the base potential of the transisor 26 drops momentarily, and the latter is cut off. As a result, the electromagnet 34 releases the lever 12 and the shutter-closing ring 2 can perform its executing motion. The exposure process is consequently completed. If the release member 15 is now freed, all parts return to their initial positions as shown in the drawing, and a new exposure cycle may commence.

Instead of the indicating lamp 33, an electromagnet can be connected in series with the conducting circuit of transistor 26. The electromagnet can then function to display a flag or a symbol within the viewer. It is also quite possible to use the electromagnet 34 for this purpose, since the timing of its actuation corresponds to the required indicating operation.

While the invention has been illustrated and described as embodied in photographic shutters, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. In a shutter actuating arrangement for maintaining a shutter in an open position depending upon the intensity of ambient light, in combination, actuating means adapted to move between an inoperative position and an operative position in which it maintains said shutter in open position; means permanently tending to move said actuating means into inoperative position; electromagnetic means tending to move said actuating means in operative position upon energization; electrical indicator means adapted to indicate the sufficiency of ambient light for exposure purposes; a shutter opening member adapted to move the said shutter into said open position thereof; photosensitive means the resistance of which varies with the intensity of ambient light; a source of direct current; and switching means comprising a first transistor connected to said electromagnetic means and said indicator means for operating same; a second transistor for driving said first transistor between conducting and nonconducting states, said electromagnetic means and said indicator means being energizable and operable when said first transistor is in the conducting state; and means coupling said photosensitive means to said second transistor for controlling the latter in relation to the intensity of the ambient light.

2. The shutter actuating arrangement as defined in claim 1, wherein the collector of said first transistor is connected to said electromagnetic means and to said indicator means.

3. The shutter actuating arrangement as defined in claim 2, wherein the base of said first transistor is connected to the collector of said second transistor.

4. The shutter actuating arrangement as defined in claim 3, including a first resistor means connected between said source of direct current and the collector of said second transistor.

5. The shutter actuating arrangement as defined in claim 4, including a second resistor means connected between the emitters of said first and second transistors; and a third transistor means connected between the emitter of said second transistor and said source of direct current.

6. The shutter actuating arrangement as defined in claim 1, wherein said first and second transistors are npn transistors.

7. The shutter actuating arrangement as defined in claim 1, including a fourth resistor means, connected, on one hand, to said photosensitive means and to the base of said second transistor and, on the other hand, to said source of direct current for forming a voltage divider means with said photosensitive means.

8. The shutter actuating arrangement as defined in claim 7, including a fifth resistor means connected, on one hand, to the base of said second transistor and, on the other hand, to said photosensitive means and to said fourth resistor means.

9. The shutter actuating arrangement as defined in claim 7, including release means for releasing said shutter; and first switching contacts actuated by said release means and connecting said source of direct current to said switching means during the release process of said shutter.

10. The shutter actuating arrangement, as defined in claim 9, including capacitor means connected to said source of direct current to become charged in relation to the conductivity of said photosensitive means; and second switching contacts actuated by said release means to disconnect said fourth resistor means from said photosensitive means and to connect thereafter said capacitor means to said photosensitive means, said second switching contacts being actuated prior to the point of release of said shutter.

References Cited

UNITED STATES PATENTS

| | | | |
|---|---|---|---|
| 3,373,672 | 3/1968 | Ichijo et al. | 95—63 |
| 3,397,629 | 8/1968 | Mori et al. | 95—10 |

NORTON ANSHER, *Primary Examiner.*

JOSEPH F. PETERS, JR., *Assistant Examiner.*

U.S. Cl. X.R.

95—53